S. E. GERTLER.
DRY CELL.
APPLICATION FILED NOV. 20, 1919.

1,390,696.

Patented Sept. 13, 1921.

Inventor
Samuel E. Gertler.
By his Attorneys
Riddle & Margeson.

UNITED STATES PATENT OFFICE.

SAMUEL E. GERTLER, OF BROOKLYN, NEW YORK.

DRY CELL.

1,390,696.  Specification of Letters Patent.  Patented Sept. 13, 1921.

Application filed November 20, 1919. Serial No. 339,490.

*To all whom it may concern:*

Be it known that I, SAMUEL E. GERTLER, a citizen of the United States, and a resident of the borough of Brooklyn, in the city of New York, county of Kings, and State of New York, have invented certain new and useful Improvements in Dry Cells, of which the following is a specification.

My invention relates to dry cells and an object thereof is the provision of a dry cell, the electrolyte of which will not form a double salt with zinc, thereby enabling a much more concentrated solution to be used then the electrolyte provided in dry cells as now constructed.

Another object of the invention is the provision of a dry cell which, for a given duty, is much smaller, volume for volume, than dry cells constructed in accordance with the practice existing up to the time of the present invention.

A still further object of the invention is the provision of a dry battery cell structure wherein a number of cells are arranged in multiple, the dimensions of the multiple dry battery cell structure being no greater than that required for a single dry cell as now known.

In dry cells of the La Clanche type, the electrolyte used is an ammonium chlorid solution. This cannot be more than a twenty per cent. solution since, when the cell is in use a double compound of zinc ammonium chlorid is formed which is deposited on the zinc of the cell and as this salt is highly resistant electrically the zinc cannot function properly.

I have found by experiment that if a chlorid, calcium chlorid, for example, which will not form a double salt with zinc and will not chemically react to any great extent with the zinc be used as the electrolyte, a much more concentrated solution may be used than possible with the electrolytes now used, thereby enabling the volume of the cell for a given duty to be very materially reduced.

I have found also, that by the use of such an electrolyte I am enabled to obtain a potential difference between the zinc and the carbon of the cell, at least one and one-half volts.

Another advantage of my improved dry cell structure is that where a multiple arrangement of cells is desired this may be accomplished very readily by providing a single dry cell embodying a plurality of zincs and a plurality of carbons connected in multiple, the volume of which dry cell would be no greater than that of the ordinary single cell but would be capable of performing the same duty as a plurality of the usual dry cells connected in multiple.

By way of illustration, reference may be made to the accompanying drawings, wherein—

Figure 1:
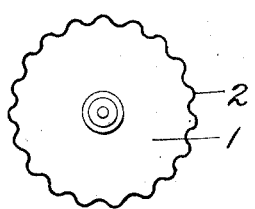
Figure 2:
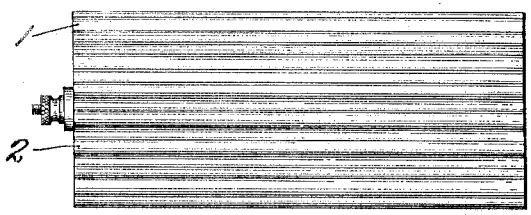
Figure 3:
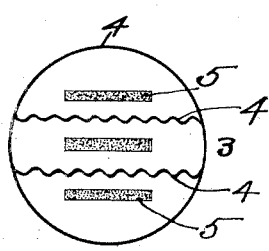
Figure 4:
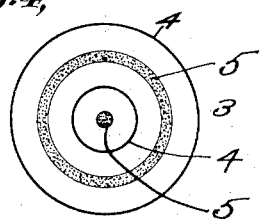
Figure 5:
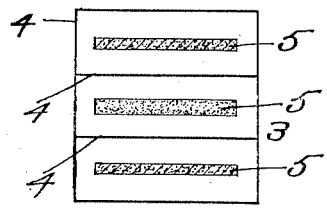

Figures 1 and 2 show an improved form of zinc element to be used in connection with my invention; and Figs. 3, 4 and 5 show diagrammatically a cell structure wherein a plurality of zincs and a plurality of carbons may be connected in multiple.

In Figs. 1 and 2 the zinc of a dry cell is designated 1, this zinc being formed with corrugations 2, whereby the outside dimensions of the cell remain as in the ordinary dry cell but the surface of zinc exposed to the action of the electrolyte is very much increased, so that when my electrolyte, which is a much more concentrated solution than the ammonium chlorid ordinarily provided, is used the surface of zinc exposed to the action of the electrolyte is correspondingly increased, while, however, the outside dimensions of the cell are maintained constant.

It is to be understood that I am not to be limited to corrugations as obviously any other expedient for increasing the surface of zinc exposed to the action of the electrolyte without increasing the outside dimensions of the zinc, comes within the purview of this invention.

In Figs. 3, 4 and 5 I have shown a dry cell designated 3 in each instance, in which a plurality of zincs 4 and a plurality of carbons 5 may be connected in multiple, the arrangement of the zincs and carbons being such that while a sufficient zinc surface is exposed to the action of the electrolyte, which it will be remembered, is a more concentrated solution than possible with ammonium chlorid, the cell as a whole affords all the advantages of a number of dry cells connected in multiple with the additional advantage that the volume of this improved dry cell structure is only that of the ordinary single dry cell.

What I claim as new is:

1. A dry cell the electrolyte of which is a chlorid which will not form a double salt with zinc.

2. A dry cell the electrolyte of which is calcium chlorid.

3. A dry cell comprising spaced electrodes one of which is zinc, and an electrolyte of calcium chlorid.

4. A dry cell comprising a plurality of zincs and a plurality of carbons connected in multiple.

5. A dry cell comprising a zinc element, a carbon element and calcium chlorid, the area of the zinc exposed to the action of the calcium chlorid being greater than the outside dimensions of the cell.

6. A dry cell comprising a plurality of zincs and a plurality of carbons connected in multiple, and an electrolyte composed of calcium chlorid.

7. A dry cell comprising a zinc container with several partions, and positive electrodes disposed in the compartments formed by the partitions and container, said positive electrodes being connected in multiple.

This specification signed this 18th day of November, A. D., 1919.

SAMUEL E. GERTLER.